Patented Dec. 26, 1933

1,941,012

UNITED STATES PATENT OFFICE 1,941,012

RUBBER COMPOSITION AND METHOD OF MAKING SAME

Webster N. Jones, Akron, Ohio, assignor to The B. F. Goodrich Company, New York, N. Y., a corporation of New York No Drawing. Application August 15, 1927
Serial No. 213,223

5 Claims. (Cl. 18—50)

This invention relates to a method of producing a rubber composition having high resistance to deterioration under the influence of heat, light and exposure to air and moisture and to a rubber composition made by such process. It has long been recognized that vulcanized rubber goods, such as tires, garden hose and other articles when exposed to light, heat, and air deteriorate with greater or less rapidity. As a consequence, attempts have been made to treat rubber compositions with substances which extend the useful life of manufactured rubber articles. To this end it has been proposed to apply to the surface of manufactured rubber articles preservative compositions and also to introduce into the rubber mix before vulcanization materials generally classified under the term "antioxidant". A purpose of the present invention is to provide an antioxidant of a class last referred which shall be more effective in retarding the deteriorating influences hereinabove referred to and which shall be economical to manufacture and which can be used in relatively small proportions in the rubber mix.

I have found that the poly-arylamino derivatives of aliphatic hydrocarbons, and especially the diaryl polymethylene diamines, are particularly effective in retarding deterioration of rubber compounds in which they are incorporated in the raw rubber mix. Although it is to be understood that these condensation products may be used to prevent the deterioration and hardening of crude rubber in storage, they may be applied to articles already vulcanized to increase the normal period of their usefulness.

The amino derivatives of the present application may be made by any of the well known methods for making secondary amines. For example, an arylamine may be reacted in the proper molecular proportions with a polyhalogenated aliphatic hydrocarbon. The corresponding poly-secondary amine will be formed together with the corresponding hydrogen halide. Preferably the materials are placed in a steam jacketed kettle fitted with a reflux condenser and a mechanical stirrer and the material heated with stirring for one or more hours. The resulting mixture is acid in reaction and is neutralized by the addition of caustic or other alkali, the alkaline liquor settling to the bottom and being drawn off and the remainder being steamed distilled to remove excess amine. The residue when cooled with stirring in an open vessel solidifies into a product which can be washed to remove all traces of the caustic, filtered, and air dried.

*Example 1.*—As an example of a preferred embodiment of my invention, I place 215 parts of para-toluidine in a kettle and heat the material with stirring until it has attained a temperature of approximately 373° F. I then add gradually with stirring 50 parts of ethylene dichloride and continue the heating for approximately an hour after refluxing has ceased. The reaction probably takes place chiefly according to the following equation:

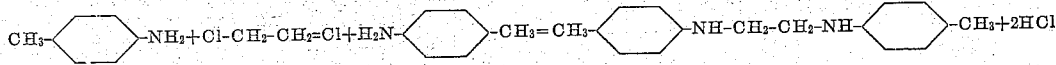

To this reaction mixture is added slowly 160 parts of water followed by the gradual addition of 45 parts of caustic soda. The mixture is stirred thoroughly and then the alkaline liquid is allowed to separate out at the bottom. The latter is drawn off and the remainder is steam distilled to remove the excess para-toluidine. The residue is solidified by stirring in an open vessel, ground, washed and dried ready for use in a rubber composition. The crude ditolyl-ethylene-diamine is of a light brown color and has a melting point of 182–191° F. Washing with gasoline removes the color and raises the melting point to 197–200° F. with a loss in weight of about 12.5%.

The ditolyl-ethylene-diamine prepared as described above is a very effective age-resister or antioxidant in rubber, as is shown in the following tests. Two rubber compositions were prepared. One contained smoked sheet rubber 100 parts by weight, gas black 25 parts, zinc oxide 10 parts, sulfur 3 parts, organic accelerator 0.5 parts, and the other contained in addition to the above ingredients 0.5 parts of ditolyl-ethylene-diamine. After a thorough mixing the two compositions were cured in a press at 300° F. for 45 minutes to produce an optimum cure. The vulcanized compositions were tested to compare their relative rates of aging by measuring the tensile strength at the breaking point before and after aging. The accelerated aging was carried out in the Bierer-Davis bomb in which the samples were maintained at a temperature of 158° F. in an atmosphere of oxygen at a pressure of 300 lbs. per sq. in. The results of the tests are shown in the following table:

Table I.—Tensile strength at break in pounds per square inch

| Exposure-bomb test | Without antioxidant | With antioxidant |
|---|---|---|
| Before ageing | 3420 | 3450 |
| After 24 hours | 730 | |
| After 48 hours | 520 | 1808 |

I have also found that the diaryl-polymethylene-diamines and other similar products may be further condensed with aldehydes to produce reaction products of equal or superior age-resisting properties which products generally have physical properties rendering them somewhat better adapted for use in certain standard methods of rubber compounding. The following examples are illustrative of condensation products of this latter type.

*Example 2.*—I take 122 parts by weight of the condensation product of p-toluidine and ethylene-dichloride, prepared as in Example 1, and add thereto 69 parts of crude aldol and 3.5 parts of concentrated hydrochloric acid, the admixture being heated with stirring to 290° F. The resulting viscous liquid is poured into a flat pan and allowed to cool into hard brittle sheets. The latter is ground to a fine powder in which condition it is suitable for use as an antioxidant in rubber mixes.

Tests of this condensation product made in the same manner indicated in Example 1 showed the following results:

Table II.—Tensile strength at break in pounds per square inch

| Exposure-bomb test | Without antioxidant | With antioxidant |
|---|---|---|
| Before ageing | 3420 | 3500 |
| After 24 hours | 730 | 2690 |
| After 48 hours | 520 | 1810 |

While specific examples have been hereinabove given it is to be understood that they are purely illustrative of embodiments of my invention and it is not my intention to limit this invention to these specific ingredients or to the specific methods of employing them in the preparation of antioxidants.

Extensive experimentation indicates that amines including primary, secondary and substituted amines, such as aniline, monoalkyaniline, xylidines, the toluidines, the toluylenediamines, benzidine, the naphthylenediamines, p-amino dimethylaniline and the like react in general with polyhalogenated paraffins to form substances which are arylamino derivatives of aliphatic hydrocarbons. Among the polyhalogenated paraffines the poly-methylene diamines are particularly effective altho alipathic compounds containing branched hydrocarbon chains, as well as those containing several halogen atoms, are also operative. I have found ethylene dichloride, and ethylene dibromide to be economical and effective in the processes of this application. The term "halogenated" as employed in this specification is intended to include only the chlorine, bromine and iodine derivatives and to exclude the fluorine derivative, a sense in which this term "halogenated" is most commonly employed.

Further it is to be understood that aldehydes in general, both aromatic and aliphatic, may be employed in the preparation of the condensation products of the types described in the Example 2, the liquid aliphatic aldehydes having been found however to be the more satisfactory. It will also be apparent to those skilled in this art that the invention of the present application is not limited to any particular type of rubber compound but is adapted for use with all compounds of rubber and rubber-like materials such as balata and gutta percha, and may be employed with other compositions which deteriorate when exposed to light, heat, air or moisture by reason of a slow oxidation of the composition.

I claim:

1. The method of retarding deterioration of rubber which comprises treating rubber with the condensation product of di-p-tolyl ethylene diamine with aldol.

2. An age-resisting rubber composition comprising rubber treated with the condensation product of di-p-tolyl ethylene diamine with aldol.

3. An age-resisting rubber composition comprising rubber treated prior to its vulcanization with the condensation product of di-p-tolyl ethylene diamine with aldol.

4. The method of retarding the deterioration of rubber which comprises treating rubber with the condensation product of aldol with a diaryl ethylene diamine in which each aryl group is a hydrocarbon group containing only one aromatic ring.

5. A composition comprising rubber and the condensation product of aldol with a diaryl ethylene diamine in which each aryl group is a hydrocarbon group containing only one aromatic ring.

WEBSTER N. JONES.

Certificate of Correction

Patent No. 1,941,012. December 26, 1933.

WEBSTER N. JONES

It is hereby certified that error appears in the printed specification of the above numbered patent requiring correction as follows: Page 1, line 20, for the second material of the equation "Cl—CH$_2$—CH$_2$=Cl" read $Cl-CH_2-CH_2-Cl$; and that the said Letters Patent should be read with this correction therein that the same may conform to the record of the case in the Patent Office.

Signed and sealed this 4th day of December, A. D. 1934.

[SEAL]

LESLIE FRAZER,
*Acting Commissioner of Patents.*